Dec. 6, 1955            A. WARRING            2,725,630

KNIFE BLADE ATTACHMENT

Filed Aug. 11, 1953

INVENTOR.
ALFRED WARRING
BY
ATTORNEY

United States Patent Office 2,725,630
Patented Dec. 6, 1955

2,725,630

KNIFE BLADE ATTACHMENT

Alfred Warring, Detroit, Mich.

Application August 11, 1953, Serial No. 373,583

6 Claims. (Cl. 30—299)

My invention relates to a new and useful improvement in a knife blade attachment.

When certain types of food are served and especially meats, such as steaks and the like, frequently the meat appears to be tough due to the fact that the table knife is not sufficiently sharp. This results in inconvenience to the diner and often times embarrassment to the person or establishment serving the food. In some instances, a special knife is served with steaks, the knife so served being supposedly sharper than the ordinary table knife. Some of these special steak knives have a serrated edge and after such a knife becomes dull, it is practically impossible to resharpen it. There are other types of steak knives having a plain cutting edge which it is intended should be maintained quite sharp. However, in large establishments, such as hotels and restaurants, it is practically impossible to maintain such a knife in a sharp condition because during the washing operation, the pieces of table ware are frequently brought into contact with each other resulting in a dulling of the cutting edge.

The present invention has as its object the provision of an attachment which may be economically manufactured and which is provided with a sharp cutting edge and so arranged and constructed that it may be easily attached on and detached from an ordinary table knife.

Another object of the invention is the provision of an attachment of this class which will be simple in structure, economical of manufacture, highly efficient in use and easily and quickly attached to and removed from the blade of a table knife.

Another object of the invention is the provision of an attachment of this class which may be mounted on the knives of different dimensions and which, when mounted on the knife blade, will be securely held in position.

Other objects will appear hereinafter.

It is recognized that various modifications and changes may be made in the detail of structure illustrated and it is intended that the present disclosure shall be considered to be by the preferred embodiment.

Forming a part of this application are drawings in which.

Figure 1:
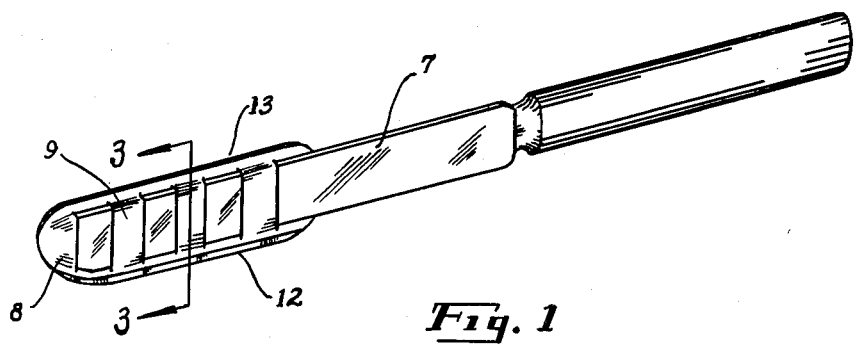
Fig. 1 is a perspective view of a knife blade showing the invention attached.
Figure 2:
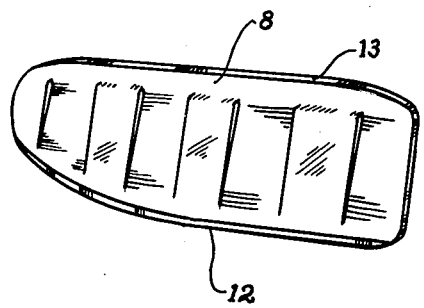
Fig. 2 is an elevation or view of the invention.
Figure 3:
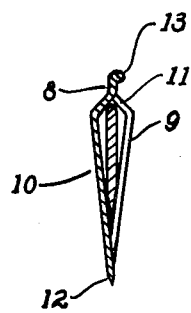
Fig. 3 is a sectional view, slightly enlarged, taken on line 3—3 of Fig. 1.

In the drawings, I have shown the invention used with the knife blade 7. The attachment comprises a plate or body 8 formed from suitable metal. Punched out of this body 8 are tongues 9 which extend outwardly from one face of the body 8. Similar tongues 10 are pressed outwardly from the opposite face of the body 8. As clearly shown in Fig. 3, these tongues are pressed outwardly from the face of the body 8 on an angle so that each tongue has the angularly turned position 11 at the upper edge and proceeding downwardly the off-set diminishes until the tongues blend into the lower position of the body 8. The lower edge 12 is sharpened and a rounded bead 13 is formed on the upper edge.

Due to the pressing of the tongues outwardly and forming them with the angularly turned portion 11, the attachment may be mounted on blades of different dimensions. By having the tongues extend outwardly, alternately from opposite sides, from the attachment body 8 the attachment is maintained centered with the knife blade 7.

The attachment may be very easily and quickly slipped onto the blade 7 and there is sufficient resiliency in the metal of the body 8 so that the tongues 9 and 10 securely clamp the blade 7 to retain the attachment in fixed relation thereof. These attachments are economical to manufacture and they may be bought in quantity so that attachments with a sufficiently sharp edge 12 will always be available. By having the bead 13 formed on the upper edge of the attachment, the likelihood of a person cutting his finger by placing it on the upper edge of the attachment is avoided.

Experience has shown that such an attachment is highly efficient in use and that with the use of such, the objection features referred to above is avoided.

What I claim is:

1. A knife blade attachment of the class described, comprising: a resilient metallic body having a cutting edge on one side; a plurality of transversely extended tongues on said body in longitudinally spaced relation between the longitudinal edges of said body, said tongues being outwardly off-set from the face of said body, alternate tongues being off-set from opposite faces of said body, the amount of off-set of said tongues from the face of said body increasing proceeding transversely of said body from the cutting edge.

2. A knife blade attachment of the class described, comprising: a resilient metallic body having a cutting edge on one side; a plurality of transversely extended tongues on said body in longitudinally spaced relation between the longitudinal edges of said body, said tongues being outwardly off-set from the face of said body, alternate tongues being off-set from opposite faces of said body, the amount of off-set of said tongues from the face of said body increasing proceeding transversely of said body from the cutting edge, and each of said tongues having an angularly turned portion at the upper end thereof connecting to said body.

3. A knife blade attachment of the class described, comprising: a resilient metallic body having a cutting edge on one side; a plurality of transversely extended tongues on said body in longitudinally spaced relation between the longitudinal edges of said body, said tongues being outwardly off-set from the face of said body, alternate tongues being off-set from opposite faces of said body, the amount of off-set of said tongues from the face of said body increasing proceeding transversely of said body from the cutting edge and each of said tongues having an angularly turned portion at the upper end thereof connecting to said body, the upper edge of said body being rounded off.

4. In combination with a table knife having a blade with a cutting edge and a rounded back edge, an elongated body having on one side a sharp cutting edge and a rounded portion on the opposite edge, said body being of less length and of greater width than said blade; and a plurality of spaced apart tongues punched outwardly alternately from opposite sides of said body to provide a space for the reception of the forward end of said knife blade, the amount of offset of said tongues from the face of said body increasing transversely of said body proceeding from the cutting edge.

5. In combination with a table knife having a blade with a cutting edge and a back edge, said blade being of greater thickness at the back edge than at the cutting edge, an elongated body having on one side a sharp cutting edge, said body being of less length and of greater width than said blade; and a plurality of spaced apart tongues punched outwardly alternately from opposite sides of said body to provide a space for the reception of the forward end of said knife blade, said body at its opposite edges projecting beyond the opposite edges of said knife blade.

6. In combination with a table knife having a blade with a cutting edge and a back edge, an elongated body having on one side a sharp cutting edge; said body being of greater width than said blade; and a plurality of spaced apart tongues punched outwardly alternately from opposite sides of said body to provide a space for the reception of the forward edge of said knife blade for retaining the cutting edge of said body in alignment with the plane of said knife blade, said body at its opposite edges projecting beyond the opposite edges of said knife blade.

References Cited in the file of this patent

UNITED STATES PATENTS

| | | |
|---|---|---|
| 1,453,082 | Rosenberg | Apr. 24, 1923 |
| 1,961,531 | Seek | June 5, 1934 |
| 2,116,852 | Stanford et al. | May 10, 1938 |
| 2,280,778 | Andersen | Apr. 28, 1942 |
| 2,653,382 | Twiss | Sept. 29, 1953 |